Patented Sept. 12, 1922.

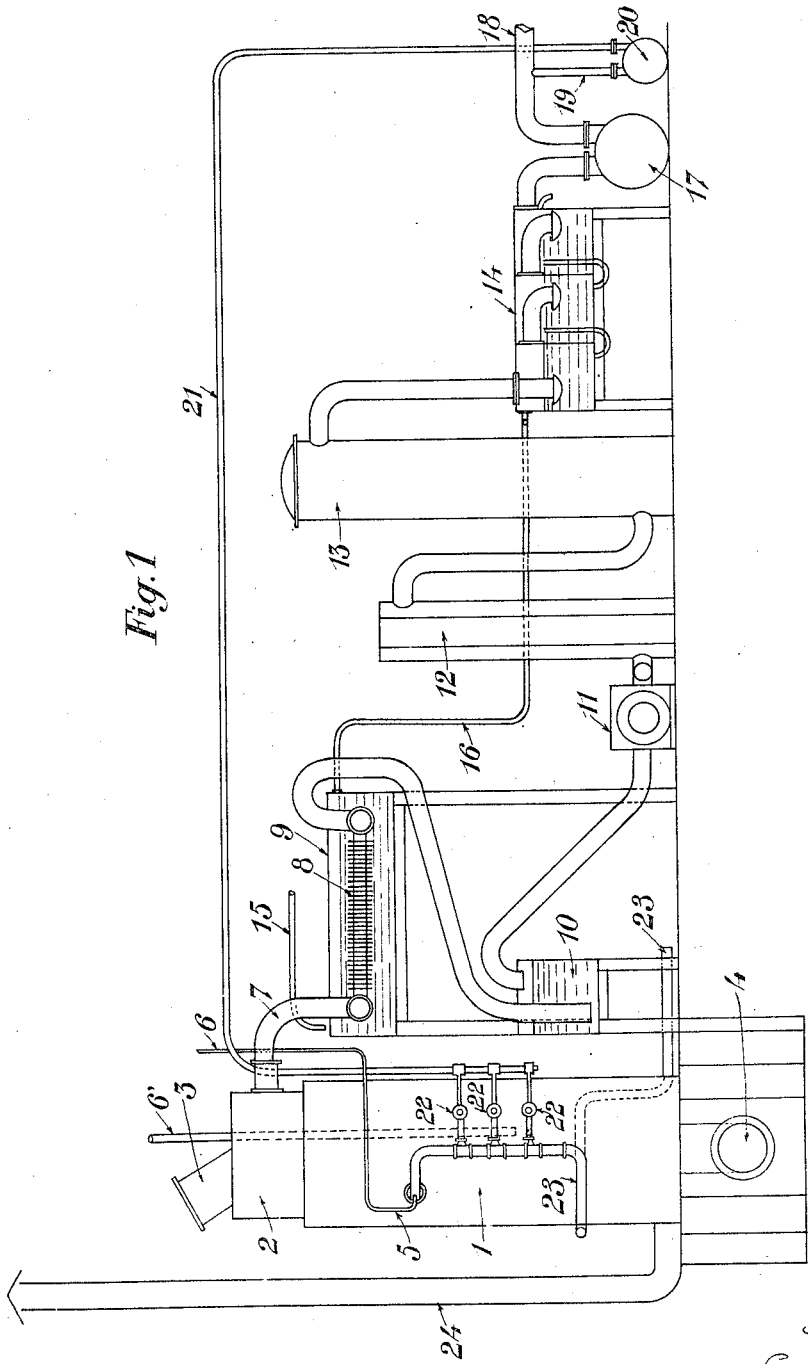

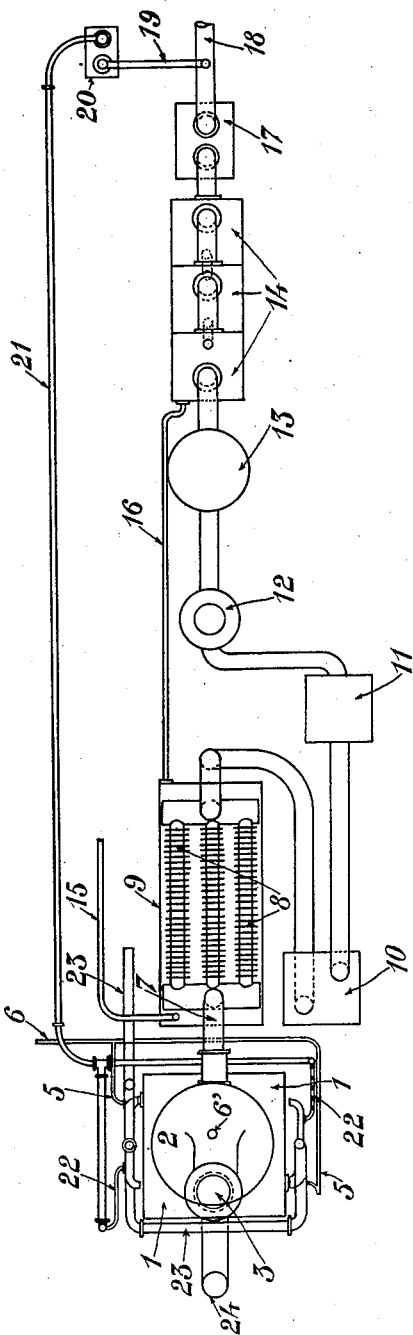

1,428,879

UNITED STATES PATENT OFFICE.

LÉON COLSON, OF PARIS, FRANCE.

APPARATUS AND METHOD FOR THE PRODUCTION OF A GASEOUS MIXTURE OF $CH_4+H$.

Application filed December 12, 1918. Serial No. 266,489.

*To all whom it may concern:*

Be it known that LÉON COLSON, engineer, a citizen of the Republic of France, and residing at 58 Rue de Maubeuge, Paris, France, has invented certain new and useful Improvement in Apparatus and Methods for the Production of a Gaseous Mixture of $CH_4+H$, of which the following is a specification.

The object of the invention is to obtain by one and the same operation, and through direct intervention of the selected catalyzer, a gas consisting of hydrogen and methane only, and as a residue, carbonic acid.

It is known that if water gas is caused to pass over a mixture of calcic hydrate and of quicklime, at about 400° C., we obtain carbonate of lime, methane and hydrogen, according to the reaction:

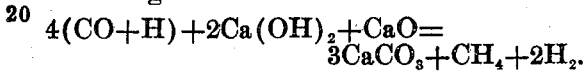

It is shown that we can produce water gas in the transforming apparatus itself by adding carbon to the lime and injecting steam into the mass raised to a suitable temperature, and that when this temperature exceeds 800° C. and is maintained between 800° and 1200°, the rapidity of the reaction is accelerated at the same time as the lime is regenerated from its carbonate which decomposes at the temperature named, so that the quantity of lime can be considerably reduced. The general reaction is the following:

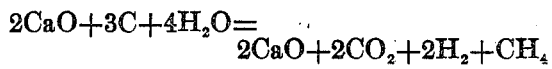

The gas obtained comprises in this case carbonic acid and a certain quantity of carbonic oxide due to a partial decomposition of the carbonic acid in presence of carbon; this gas can be eliminated by a suitable purification process.

It has also been proposed to introduce steam into the water gas passing over the heated anhydrous lime, so as to obtain the following reactions at temperatures higher than that at which the carbonate of lime is decomposed:

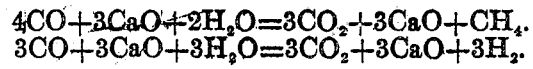

It has also been shown that in the presence of lime and at the temperatures at which the operations are carried out, the presence of carbonic acid can induce certain reversible subsidiary reactions which must be determined experimentally in order to ascertain the quantity of steam to be added to the gas, for the purpose of reducing the content of carbonic acid in the produced gas.

The apparatus according to the present invention is represented by way of example more or less diagrammatically in the accompanying drawing.

Fig. 1 shows the apparatus in elevation;
Fig. 2 is a plan.

In a brickwork furnace 1 is placed a retort 2 of cast iron or refractory material. This retort can be charged with a mixture of coal and lime through a suitable aperture 3 provided at its upper part.

The furnace is heated during the first part of the operation by heavy oil burners 5 fed by a pipe 6 or by gases from a gas generating plant. The heating is carried sufficiently far to obtain a temperature between 700° C. and 1200° C.

When the required temperature has been obtained steam is injected into the mass contained in the retort and gasification occurs according to the known reactions. Steam enters by a perforated tube 6' of which the lower extremity is at the lower zone of the burners.

After gasification by the steam the residues are discharged through an opening 4 provided at the lower part of the retort.

The gases coming from the retort 2 by a pipe 7 pass into a worm provided with gills or radiating flanges 8 arranged in a tank 9 containing a solution of bicarbonate of potash to which they give up part of their heat.

This tank is called the reduction tank; the bicarbonate which it contains is brought to the condition of neutral carbonate in consequence of the rise of temperature of the solution of bicarbonate under the influence of the hot gas passing in the tubes forming the worm. 8. After the tank 9 are arranged: an apparatus 10 forming an hydraulic joint preventing any return of the gas to the retort during the charging, a pump 11 for drawng the gas from the retort and forcing it through the apparatus, and a suitable heat exchanger 12 for reducing the temperature so as to allow of the absorption of the ammonia gas in apparatus 13.

The ammonia gas present in the gaseous products coming from the retort is absorbed in a suitable apparatus 13 which allows it to be retained either in aqueous solution or in the condition of sulphate of ammonia, if a solution of sulphuric acid is placed in the absorbing apparatus.

The gas coming from the apparatus 13 passes into an arrangement 14 in which it is freed from its carbonic acid. This arrangement consists of a series of apparatus which cause the gas to pass into a solution of neutral carbonate of potassium.

The solution when it is saturated with carbonic acid is sent to the tank 9 by a pipe 15 in order to reduce the bicarbonate to neutral carbonate of potassium under the action of the heat of the gases coming from the retort or under the action of the heat provided by any other suitable source.

When the decarbonization has taken place the solution of neutral carbonate returns from the tank 9 to the apparatus 14 to serve for a new absorption of carbonic acid. This return is effected by the pipe 16.

The purified gas coming from the apparatus 14 traverses a meter 17 before it is led to the gasometer by a pipe 18.

A branch 19 can be provided on the pipe 18 for the service of the works. The gas from the branch 19 traverses a meter 20 and is led to the works by a pipe 21.

The drawing shows the pipe 21 feeding the gas burners 22 and replacing the heavy oil heating the retort 2, when the operation has been commenced.

The gas burners and the heavy oil burners are fed with air at a suitable pressure by a pipe 23 connected with some source of air under pressure.

A chimney 24 discharges the products of combustion of the burners.

The following are the steps for carrying out the process in the apparatus described:

First, retort 2, charged with coal and lime, is heated to between 700° C. to 1200° C. (1300° F. to 2200° F.) by burners 5 fed by oil at first, but later by the gaseous mixtures produced in the apparatus.

Second, when this temperature has been reached, steam is injected through pipe 6 and gasification takes place.

Third, the suction pump 11 now draws the gases from the retort through pipe 7 having radiating flanges 8, the latter being placed in the reduction tank 9 filled with bicarbonate of potassium which is thus heated. A hydraulic joint 10, placed between the tank and the pump, prevents the return of the gases to the retort during the charging.

Fourth, the pump now sends the gases through the pipe to the heat exchanger 12 where their temperature is reduced to facilitate their giving up ammonia.

Fifth, through pipe connection between the top of the heat exchanger and the bottom of the cistern 13, the gases now pass to the latter where they are delivered of their ammonia either in liquid form or as ammonia sulphate if the cistern is charged with sulphuric acid solution.

Sixth, from the top of the cistern the gases are now conducted into a solution of neutral carbonate of potassium in the decarbonizer 14 where they are freed from carbonic acid, and the thus saturated solution is then conducted through pipe 15 to the reduction tank 9 where reduction to neutral carbonate takes place, facilitated by the heat from the radiating flanges 8, which carbonate is returned through pipe 16 to the decarbonizer 14 to absorb more carbonic acid.

Seventh, the purified gas mixture of methane and hydrogen ($CH_4+H$) ready for use, is finally collected and carried from the decarbonizer by pipe 18 through a meter to be utilized in a factory. A portion of the gas mixture is here shown conducted through pipe 21 past another meter 20 to the burners for the retort 2.

What I claim is:

1. Apparatus for completely gasifying combustible carbon matter by the action of steam in the presence of lime at a suitable temperature comprising in combination: a furnace, a retort heated by burners, a heat exchanger for lowering the temperature of the gases from the retort, means for absorbing the ammonia from the gases, means for absorbing carbonic acid and means for inducing the flow of gases through the apparatus and suitable conduits connecting the individual parts of the apparatus.

2. Apparatus for completely gasifying combustible carbon matter by the action of steam in the presence of lime at a suitable temperature, comprising in combination: a furnace, a retort therein, a heat exchanger for lowering the temperature of the gases from the retort, means for absorbing ammonia from said gases, a decarbonizer, a reduction tank, a gas conduit with a radiating worm in said tank connecting said retort with said absorbing means, and other conduits for interchanging in both directions the contents in said tank and in the de-carbonizer, said de-carbonizer being adapted to deliver the purified gas mixture to a plant for immediate use.

3. An apparatus for producing a gaseous mixture ($CH_4+H$) comprising in combination a furnace, a retort therein containing coal and lime, means for heating the furnace to between 700° and 1200° C., a perforated steam pipe extending from the top of said retort down to the heating means, a heat exchanger, a conduit connecting said retort and said heat exchanger, a radiating coil and a hydraulic seal in said conduit, a pump connected with the conduit for passing gases formed in said retort, through said coil and seal, to said heat exchanger, an absorbing vessel having pipe connection with said heat exchanger, a decarbonizer in connection with said vessel, a reduction chamber enclosing said radiating coil, means for conducting the contents of the decarbonizer to said chamber absorbing heat from the coil and other means for returning the contents of the chamber to said decarbonizer, means for collecting the refined gaseous mixture from said decarbonizer and distributing it to said furnace and to a factory.

4. A method of producing a gaseous mixture of methane and hydrogen, consisting in first heating coal and lime in a retort to a temperature over 700° C., then injecting steam into the retort, then reducing the temperature of the resulting gases to facilitate their giving up ammonia, thereupon passing the gases into a solution of neutral carbonate of potassium in a decarbonizer, then exposing the saturated solution to heat thereby reducing the bicarbonate to neutral carbonate of potassium, and then permitting said carbonate to absorb carbonic acid in said decarbonized.

In testimony whereof I affix my signature in presence of two witnesses.

LÉON COLSON.

Witnesses:
PAUL COULOMB.
JOHN F. SIMMONS.